(12) United States Patent
Garcia-Leiner et al.

(10) Patent No.: US 8,208,204 B2
(45) Date of Patent: Jun. 26, 2012

(54) MULTI-LAYER SCREEN COMPOSITES

(75) Inventors: Manuel A. Garcia-Leiner, Royersford, PA (US); Jack J. Reilly, Blue Bell, PA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/525,386

(22) PCT Filed: Jan. 25, 2008

(86) PCT No.: PCT/US2008/051992
§ 371 (c)(1),
(2), (4) Date: Jul. 31, 2009

(87) PCT Pub. No.: WO2008/097733
PCT Pub. Date: Aug. 14, 2008

(65) Prior Publication Data
US 2009/0316261 A1    Dec. 24, 2009

Related U.S. Application Data

(60) Provisional application No. 60/887,917, filed on Feb. 2, 2007.

(51) Int. Cl.
*G03B 21/60* (2006.01)
(52) U.S. Cl. .......................................... 359/453
(58) Field of Classification Search .......... 396/452–453; 359/452–453
See application file for complete search history.

(56) References Cited

U.S. PATENT DOCUMENTS

| | | | |
|---|---|---|---|
| 2,180,113 A * | 11/1939 | Land | 359/453 |
| 4,083,626 A * | 4/1978 | Miyahara et al. | 359/453 |
| 5,170,287 A | 12/1992 | Ludwig, Jr. et al. | |
| 5,237,004 A | 8/1993 | Wu et al. | |
| 5,307,205 A | 4/1994 | Ludwig, Jr. et al. | |
| 5,346,954 A | 9/1994 | Wu et al. | |
| 6,466,368 B1 | 10/2002 | Piepel et al. | |
| 6,760,155 B2 * | 7/2004 | Murayama et al. | 359/453 |
| 6,785,048 B2 * | 8/2004 | Yamaguchi et al. | 359/453 |
| 6,878,436 B2 | 4/2005 | Reilly et al. | |
| 2004/0191492 A1 | 9/2004 | Reilly et al. | |
| 2004/0240054 A1 * | 12/2004 | Aiura et al. | 359/455 |
| 2006/0003239 A1 | 1/2006 | Cooper et al. | |
| 2006/0019113 A1 | 1/2006 | Sparks et al. | |
| 2006/0268106 A1 | 11/2006 | Cooper et al. | |

* cited by examiner

*Primary Examiner* — Clayton E Laballe
*Assistant Examiner* — Leon W Rhodes, Jr.
(74) *Attorney, Agent, or Firm* — Thomas F. Roland

(57) ABSTRACT

The invention relates to multi-layer composites for use as a screen, having at least three layers, with an inner diffusing layer and at least one substrate layer on either side. The diffusing layer contains small particles having a narrow particle size distribution that are refractive-index mismatched with the polymer matrix. The multi-layer acrylic composition is useful as a projection screen.

25 Claims, 2 Drawing Sheets

MULTI-LAYER SCREEN COMPOSITES

This application claims benefit under U.S.C. §119 or §365 of U.S 60/887,917, filed Feb. 2, 2007 and PCT/US2008/051992 filed Jan. 25, 2008.

FIELD OF THE INVENTION

The invention relates to multi-layer composites for use as a screen, having at least three layers, with an inner diffusing layer and at least one substrate layer on either side. The diffusing layer contains small particles having a narrow particle size distribution that are refractive-index mismatched with the polymer matrix. The multi-layer acrylic composition is useful as a projection screen.

BACKGROUND OF THE INVENTION

Projection screens are used to display an image projected onto them. In a front projection screen, the image is viewed on the same side as the projector, and in a rear projection screen, the image is viewed on the opposite side of the screen as that of the projector. Projection screens use a diffusing mechanism, such as diffusing particles, to spread the projected image, to allow for viewing of the image from a wide variety of angles. The quality of the image, and angle from which it can be seen are important parameters for projection screens. The screen should also have physical integrity so a projected image is not distorted. Contrast ratio, gain, image definition, brightness, and screen uniformity are also important features of a projection screen.

A diffusing layer having spherical 2-15 micron, core-shell particles that are refractive index mismatched is described in U.S. Pat. No. 5,237,004.

U.S. Pat. No. 5,307,205 describes an article comprising a bi-layer sheet for use as a rear projection screen having 2-15 micron, core-shell particles. The diffusion layer faces the viewer.

A multi-layer structure for use with LED lighting is described in U.S. Pat. No. 6,878,436 produced from a co-extruded sheet having a diffusing layer and at least one substrate layer. The multi-layer extruded sheet has a very low contrast ratio and poor image quality.

When the diffusing layer is on the outside of a screen it is more likely to scratch, both during production and use. Scratches on diffusion screens in-use are so detrimental, that methods have been developed to remove or cover the scratches (i.e., as described in U.S. Pat. No. 5,170,287).

It was found that by placing the diffusing layer inside substrate layers, the overall performance of multi-layer screens (such as image definition, brightness, etc.) is not affected by the presence of superficial scratches or imperfections created during the handling of the screen, as it is typically observed in commercially available screen systems. The separation of the image-capturing layer from the sheet surface helps to preserve the image quality and prevent deterioration due to surface scratches. This reduced vulnerability to deteriorated image quality due to scratches also facilitates the overall fabrication and handling of projection screen systems. Additionally, it was found that multi-layer screens with an inner diffusing layer provide better image quality and an increased viewing angle when compared to screens having an outer diffusing layer. A further advantage is that the multi-layer screen of the invention is capable of being formed in a single co-extrusion process.

SUMMARY OF THE INVENTION

The invention relates to a multi-layer screen comprising:
a) a diffusing layer comprising:
1) 40-90 weight percent of a matrix polymer, and
2) 10 to 60 weight percent of diffusing particles having an average particle size of from 1 to 100 microns, wherein 90% by weight of said particles having an average particle size that is within ±55% of the weight average particle size,
wherein said diffusing particles and said diffusing layer matrix differ in refractive index by 0.02 or more, and
b) at least two substrate layers, one on each side of the diffusing layer.

The invention also relates to displays containing the multi-layer screen, and useful for front projection, rear projection, or a combination of both front and rear projection.

DETAILED DESCRIPTION OF THE INVENTION

The invention relates to multi-layer composites for use as projection screens having at least three layers, with an inner diffusing layer and at least one substrate layer on either side of the diffusing layer.

The multi-layer screen ranges from 0.1 to 10 millimeters, and preferably from 1 to 6.4 millimeters (0.039-0.25 inches) in thickness. The thickness of the screen is selected for the best balance of properties. In general, the thicker the screen the better contrast is achieved, but there is also less light transmission.

The inner diffusing layer has a thickness of from 0.0254-1.27 millimeters (0.001-0.50 inches), preferably from 0.127-0.635 millimeters (0.005-0.025 inches), and most preferably from 0.254-0.508 millimeters (0.010-0.020 inches). For a 6 mm (0.236 inch) thick screen the optimal value of the diffusing layer is about 0.381 mm (0.015 inches). The inner layer thickness can be optimized for other screen thicknesses. In general, the inner diffusing layer thickness will specify the performance of the projection screen.

The inner diffusing layer is composed of a polymer matrix containing one or more types of diffusing particles.

The polymer matrix can be any thermoset or thermoplastic polymer or copolymer. The term "copolymer" is meant to include polymers having two or more different monomer units. The polymer matrix used in the diffusing layer has a refractive index differing by greater than 0.02 units compared to the refractive index of the particles being used. Examples of polymers useful as the matrix of the diffusing layer include, but are not limited to: polycarbonate (PC); polyethylene terephthalate-glycol modified (PETG); polyvinyl chloride (PVC); impact modified PVC; polyesters (PET, PBT, APET, etc.); styrene acrylonitrile (SAN); acrylonitrile-acrylate copolymer; acrylonitrile-methyl methacrylate copolymer; methyl methacrylate-styrene copolymer; methacrylate-butadiene-styrene terpolymer; acrylonitrile-styrene-acrylate (ASA) terpolymer; acrylonitrile butadiene styrene (ABS) terpolymer; polystyrene (PS); high impact polystyrene (HIPS); polyolefins, including impact modified polyolefins, polycyclo-hexylethylene, cyclic olefin copolymer (COC); fluoropolymers including polyvinylidene fluoride (PVdF) polymers, copolymers and terpolymers, polytetrafluoroethylene (PTFE) polymers and copolymers, fluorinated ethylene propylene copolymer (FEP), PVdF-acrylic copolymers; acrylic polymers including imidized acrylic polymer, and impact modified acrylic polymers; polycyclo-hexylethylene, and mixtures thereof.

In one embodiment, the matrix is an acrylic polymer, which includes polymers, copolymers and terpolymers formed from alkyl methacrylate and alkyl acrylate monomers, and mixtures thereof. The alkyl methacrylate monomer is preferably methyl methacrylate, which may make up from 60 to 100 weight percent of the monomer mixture. 0 to 40 weight percent of other acrylate and methacrylate monomers (may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. Small levels of multifunctional monomers as crosslinking agents may also be used. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, and the like. Styrenic monomers such as styrene and alpha-methyl styrene could also be incorporated into the polymer.

A preferred matrix is a copolymer of methyl methacrylate and from 0.5 to 30 weight percent of $C_{2-8}$ acrylates or methacrylates. In a preferred embodiment the matrix is a copolymer of methyl methacrylate and from 0.5-6 weight percent of ethyl acrylate.

The molecular weight of the matrix polymer can range from 50,000 to 300, 000 g/mol and preferably from 70,000 to 200,000 g/mol.

The matrix polymer makes up from 40-90 weight percent of the diffusing layer.

The diffusing particles of the inner layer make up from 10 to 60 weight percent of the diffusing layer. The particles have a refractive index that is mismatched to the matrix, having a refractive index that is 0.02 or more different than that of the matrix polymer. Index of refraction can be measured by methods well known in the art such as in conformance with ASTM D 542. One or more different type of diffusing particles may be used. If more than one type and size of diffusing particles are used, at least one needs to have a narrow particle size distribution.

The diffusing particles may be organic, inorganic or a mixture thereof. The particles have an average particle size in the range of 1-100 microns, preferably 1-40 microns, more preferably 1-25 microns, and most preferably from 2-15 microns. At least one type of the particles used in the diffusing layer have a narrow particle size distribution, with 90% by weight of the particles having an average particle size that is within ±98% of the weight average particle size, preferably ±55% of the weight average particle size, more preferably ±40% of the weight average particle size, and in one embodiment ±20% of the weight average particle size. In general it was found that smaller particle size produces a better image quality.

Examples of useful particles include inorganic particles such as $BaSO_4$, $TiO_2$, $CaCO_3$; Fluoropolymer particles such as poly(tetrafluoroethylene) (PTFE), poly(chlorotrifluoroethylene) (PCTFE), poly(vinylidene fluoride) (PVDF), ethylene chlorotrifluoroethylene (ECTFE), and copolymers thereof; hydrophobic polymers such as polyalkyl oxides; polystyrene; core/shell polymer particles; cross-linked acrylic beads, preferably made by a suspension process having a composition of 0-99.99% styrene, 0-99.99% alkyl methacrylate or alkyl acrylate, or a mixture of both, and 0.01-5% crosslinking agent.

In one embodiment, the cross-linked acrylic particles are composed of 0-99.9% styrene, 0-99.9% methyl methacrylate, 0-20%, preferably 1-5%, of $(C_{1-10})$ alkyl acrylates, such as methyl acrylate (MA) and ethyl acrylate (EA), and 0.1-2.5% crosslinking agent.

In another embodiment, the particles have a core-shell structure with rubbery alkyl acrylate polymers in the core and at least one polymer shell, which is compatible to the polymer matrix. This outer shell represents only a fraction of the total particle weight. The rubbery core typically comprises an alkyl acrylate polymer having a refractive index that differs by at least 0.02 or more units from that of the matrix polymer.

Also, a combination of various diffusing particles with different size, shape and origin (organic or inorganic) could also be used to produce diffusing inner layers that could potentially apply to multi-layer structures similar to the one described in the best mode of invention.

In addition to the matrix polymer and diffusing particles, the diffusing layer may also include other modifiers or additives which are well known in the art. For example, the composition may contain colorants, impact modifiers, external lubricants, antioxidants, flame retardants or the like. If desired, ultraviolet stabilizers, thermal stabilizers, flow aids, and anti-static agents may also be added.

The multi-layer screen contains at least two substrate layers with at least one substrate layer located on each side of the diffusing layer. The substrate layers may be symmetrical or asymmetrical, having the same or different compositions, and the same or different thicknesses. In one embodiment, the substrate layers are symmetrical, allowing it to be positioned in either direction in the final application.

For rear projection screens, both substrate layers are light transmitting, meaning they have less than 30% haze and a light transmission of greater than 0. The substrate layers are not translucent. Typically, the refractive index difference between the matrix of the diffusing layer and the substrate layers is within 0.19 units. The values can even be matched so that there is no difference between the refractive index of the matrix of the diffusing layer and each of the substrate layers.

For front projection screens, the front layer (facing the viewer and projector) is light transmitting, however the rear substrate layer is translucent or opaque.

The substrate layer could be glass, but a polymer, and specifically a thermoplastic is preferred. Useful thermoplastics are the same as those described for the diffusing layer matrix. In one embodiment, the substrate layers are composed of an acrylic copolymer, primarily of methyl methacrylate with at least one $C_{1-8}$ straight chain or branched alkyl acrylates or methacrylates. A specific useful substrate is made of methyl methacrylate resins containing between 0.6-5% ethyl acrylate and molecular weights between 75,000 and 130,000 g/mol.

In a preferred embodiment, the substrate layer facing the viewer is tinted, with one or more inorganic or organic pigments or particles traditionally used to impart the desired color. The concentration of these compounds depends on the desired color and could potentially involved more than one type of chemical substance. The tinted substrate provides a better image contrast. If the screen is meant for viewing from both sides, the tint may be in both substrate layers. A dye is preferred over a pigment in the substrate layer, however pigments such as $TiO_2$, $BaSO_4$, ZnO, and other inorganic compounds may also be used. Especially useful tints are gray tints, such as those developed for CRT anti-glare screens.

In addition to the matrix polymer and diffusing particles, the diffusing layer may also include other modifiers or additives that are well known in the art. For example, the composition may contain colorants, impact modifiers, external lubricants, antioxidants, flame retardants or the like. If desired, ultraviolet stabilizers, thermal stabilizers, flow aids, and anti-static agents may also be added.

In addition to the diffusing layer and substrate layers, other layers can be part of the multi-layer screen. In an asymmetrical composite, a thin anti-glare layer can be used as the outside layer(s) facing the viewer. A typical anti-glare layer would be a thin layer with 1-18 weight percent particle loading of 17-25 nm average diameter particles that are RI matched (<0.02 of matrix).

When the refractive index of a substrate layer has a refractive index that is too different compared to the diffusing layer, multiple substrate layers may be used instead. An example would be an acrylic matrix diffusing layer in contact with a polymethyl methacrylate layer, followed by a polystyrene layer.

Other useful layers that could be made part of the multi-layer screen would include: an adhesive layer(s) (if the multi-layer screen is laminated); an abrasion resistant layer on the surface, and an anti-static surface layer.

Any and all of the layers could contain impact modifiers at a level of 0-60%.

The multi-layer screen is formed by means known in the art, primarily by coextrusion, lamination, or a combination thereof. Lamination could involve an adhesive layer, or could be in the form of heat lamination. It is important that in whatever method is used, that care is taken to avoid any trapped air between the layers.

The diffusing layer may be produced by melt blending the particles, at a loading of 1 to 60%, preferably 10 to 50%, with the thermoplastic matrix.

While melt blending is well known in the industry, one example of the process for producing an article of the present invention is as follows: The thermoplastic matrix resin is dried in a dehumidifying, forced hot air oven before being compounded with the crosslinked particles through, for example, a single-screw extruder equipped with a 2-stage, medium work screw and a vacuum venting system. A twin screw extruder equipped with a vacuum venting system may also be used for the compounding. The particles, the matrix resin, and additives are added into the feed hopper of the extruder using separate feeders. The conveyer system for the beads should be a closed system to avoid safety and dust hazards. The particles are metered into the feed hopper of the extruder using a feeder equipped with an auger screw by gravimetric control or by volumetric feeding control. The temperature profile which can be used for making the diffusing layer resin when the composition contains 10-60% suspension beads and 40-90% thermoplastic, preferably acrylic made by a free radical polymerization process, can be as follows:

Typical process conditions for a single screw, compounding extruder are listed below:

| Extruder Conditions | Conditions |
|---|---|
| Barrel Zone 1: | 225-240° C. |
| Barrel Zone 2: | 235-255° C. |
| Barrel Zone 3: | 245-260° C. |
| Screw Speed: | 60-100 RPM (revolutions per minute) |

The continuously-produced extrudate is cooled by running the strand through a water bath and subsequently cutting it into particle layer resin pellets. This particle layer resin is oven dried before further usage.

The co-extruded product may be produced by a co-extrusion process comprised of two or more extruders converting plastic resin materials into molten plastic. Typically, there is a minimum of a primary extruder and a secondary extruder, but there may also be additional extruders, such as a tertiary extruder, etc. The primary extruder is usually the largest extruder and has the highest throughput rate compared to the other individual extruder(s). Therefore, for example, in a 2-layer sheet configuration, the resin used to comprise the substrate layer is typically fed into the primary extruder and the diffusing layer resin used to comprise the diffusing layer is typically fed into the secondary extruder when using a co-extrusion set-up consisting of 2 extruders. Each of these extruders converts the resins fed to them into molten polymer, separately. The melt streams are then combined typically in a feedblock system or in a multi-manifold die set-up. In the feedblock system, there is a plug that is installed that determines how these 2 molten plastics will be layered in the final sheet. Hence, the polymer melt streams enter into the feedblock separately and are selectively combined within the feedblock. For a 2-layer sheet configuration, the particle layer may be located on either the top or bottom side of the substrate layer. For a 3-layer sheet configuration, the particle layer may be located anywhere but on the exterior surface (i.e., an interlayer or on the surface facing the light source). Once the plastic melt streams are selectively layered and co-mingled in the feedblock, the combined melt stream exits the feedblock and enters the die where the combined melt stream is spread to the width of the die. The molten plastic extrudate is then polished between highly polished chrome-plated, temperature-controlled rolls. These rolls polish and cool the sheet to the desired overall thickness. Note that a multi-manifold die may also be used to achieve a layered sheet instead of a feedblock system. The polymer melt streams enter into the multi-manifold die separately and are selectively combined and spread to the width of the die all within the multi-manifold die.

The screen of the invention can be used for both front and rear projection for displays that include a screen. In some cases, the screen can be used to display an image on both sides of the screen simultaneously. The screen of the invention provides excellent image clarity, brightness, a great viewing angle, as well as scratch resistance.

Light-diffusing properties were obtained by analyzing the angular dependent transmission using Goniophotometry. From these results, hiding power, half gain angle and diffusing factor values have been quantified for all the samples described here. The value of hiding power is estimated according to the following expression:

$$H.P. = \frac{T_{(2°)}}{T_{(0°)}}$$

Where H.P. is the hiding power, $T_{(2°)}$ represents the transmission value at 2° viewing angle and $T_{(0°)}$ is the transmission value at 0° viewing angle. In addition, half gain angle is defined as the viewing angle where the magnitude of the transmission value is reduced by 50%, with respect to the maximum transmission value observed during a given measurement (typically observed near 0° viewing angle). Finally, diffusion factor is estimated using the following expression:

$$D.F. = \frac{T_{(20°)} + T_{(70°)}}{2 \cdot T_{(5°)}}$$

Where D.F. is the diffusion factor and $T_{(20°)}$, $T_{(70°)}$ and $T_{(5°)}$ represent the transmission value at 20°, 70° and 5° viewing angle, respectively.

The multi-layer screen of the invention may optionally have additional layers on one or more of the outer surfaces that can be added by means known in the art, such as by coating, laminationa dn co-extrusion methods. The added layers can include non-glare, anti-reflection and/or mar resistant surfaces in order to avoid reflections from different light sources (overhead lighting, ambient conditions, sunlight, etc) when viewing images projected on these surfaces or protected by these materials.

These effects are typically observed in glossy materials and to overcome them, both glass and acrylic manufacturers typically impart a very fine pattern onto the outside surface of the material. The patterned surface reduces the specular reflections or gloss by scattering the light, reducing the glare on the screen, display, picture frame, sign, etc.

Even though the concept of imparting a pattern onto the surface to achieve a non-glare finish is shared by both glass and acrylic manufacturers, the approach to achieve it is very different. Typically, glass manufacturers etch the surface of the glass with an aggressive acid in order to achieve the desired texture. In contrast, state-of-the-art manufacturing for non-glare plastic surfaces include combinations of plastic extrusion and embossing processes or direct co-extrusion of specifically designed polymer compositions to impart the desired surface properties.

The embossing technology typically includes the production of plastic non-glare surfaces via the sheet extrusion process where an embossing roll is used to impart a non-glare pattern into the molten polymer extrudate as it is being polished and cooled into sheet. Examples of this approach and analysis of the shortcomings of this technology are described in U.S. Pat. No. 6,861,129 B2. The co-extrusion technology enables an economical approach to the production of non-glare plastic surfaces. In this case, it is through the specific composition of the co-extruded layers that the overall surface properties are controlled, providing a direct route to the production of non-glare and mar resistant surfaces. This is also described in detail in U.S. Pat. No. 6,861,129 B2. In general this approach allows for easier production of non-glare sheet products, where the line does not need to be shut down to change from a highly polished sheet product to a specialty non-glare sheet product. Also, the gloss properties of the resultant sheet at various thicknesses are much more consistent when compared with sheet produced using the embossing technology. And finally, via co-extrusion the mar resistance properties of the resultant sheet are improved compared to typically extruded sheet product all in one processing step.

All the approaches described above could be followed for the production of projection screens, television and computer screens, displays and other applications such as picture frame and signs with non-glare, scratch or abrasion resistant and mar resistant properties.

In addition to the above-referred properties, the screen of the invention could also display antistatic properties. As described in U.S. Pat. No. 6,525,134 for example, the formation and retention of static electricity charges at the surface of most plastics are known. The presence of static electricity on protective films can cause the accumulation of dust on the objects to be protected and thus inhibit their use. Static electricity causes the accumulation of dust at the surface of these objects, altering the overall transparency and in general the optical properties of these objects.

A common approach to antistatic polymers includes the addition of antistatic agents such as ionic surfactants of the sulphonate or ethoxylated amine type, added to polymers under specific conditions. However, the antistatic properties of the polymers resulting from this approach depend on the ambient humidity and they are not permanent since these agents migrate to the surface of the polymers and disappear. Polymers containing polyamide blocks and hydrophilic polyether blocks have thus been proposed as antistatic agents, these agents having the advantage of not migrating and thus of giving permanent antistatic properties that are more independent of the ambient humidity.

A particular example is described in U.S. Pat. No. 6,525,134, where a permanently antistatic nature is provided to commercially available acrylic resins, through the use of a composition comprising an acrylic polymer (A), a copolymer (B) containing polyamide blocks and polyether blocks essentially comprising ethylene oxide ($C_2H_4O$) units, and a polymer (C) chosen from acrylic impact modifiers and/or functional polymers. This approach provides antistatic properties to acrylic resins consisting essentially only of acrylic polymer, or resins consisting of a mixture of acrylic polymer and of an impact modifier. This approach provides additional improvements to the impact behavior, in particular the multiaxial impact behavior, without adversely affecting the transparency for the case of PMMA, as described in U.S. Pat. No. 6,525,134. Furthermore, it is also possible to combine the approaches described above to achieve both non-glare and anti-static properties. This may be accomplished using the co-extrusion or film lamination processes where one or more of the outerlayers comprise the non-glare approach described in U.S. Pat. No. 6,861,129 B2 and in addition it also is comprised of the active anti-static agent described in U.S. Pat. No. 6,525,134. Hence, the surface layer(s) provide the resultant screen with non-glare, mar resistance and anti-static properties.

The multi-layer screen of the invention may be rigid or flexible. In one embodiment. The multi-layer screen can be retracted (rolled) up toward the ceiling, and lowered (unrolled) for use as a screen.

The multi-layer screen of the invention may be used in a flat position, or may be used in a non-flat configuration. In one embodiment, the multi-layer screen may be wrapped around a column of any shape—such as a support column in a building. In another embodiment, the multi-layer screen may be thermoformed into any shape.

EXAMPLES

Example 1

Particle Size Effect

Figure 1:
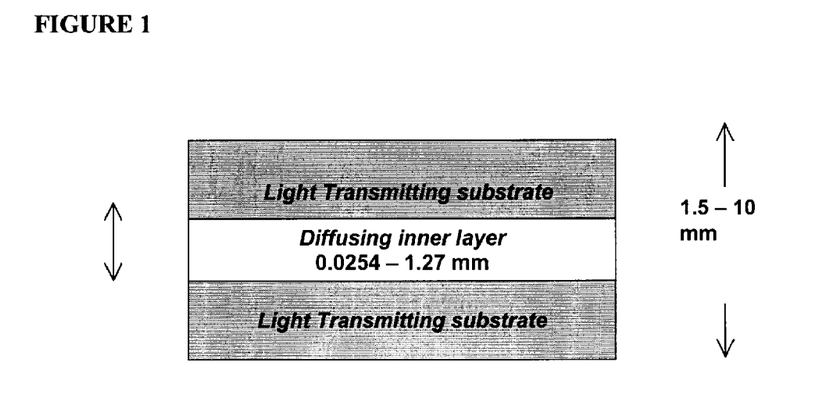
FIG. 1: Is a diagram of a typical multi-layer sheet of the invention, having an inner Diffusing layer, with Substrate layers on each side.
Figure 2:
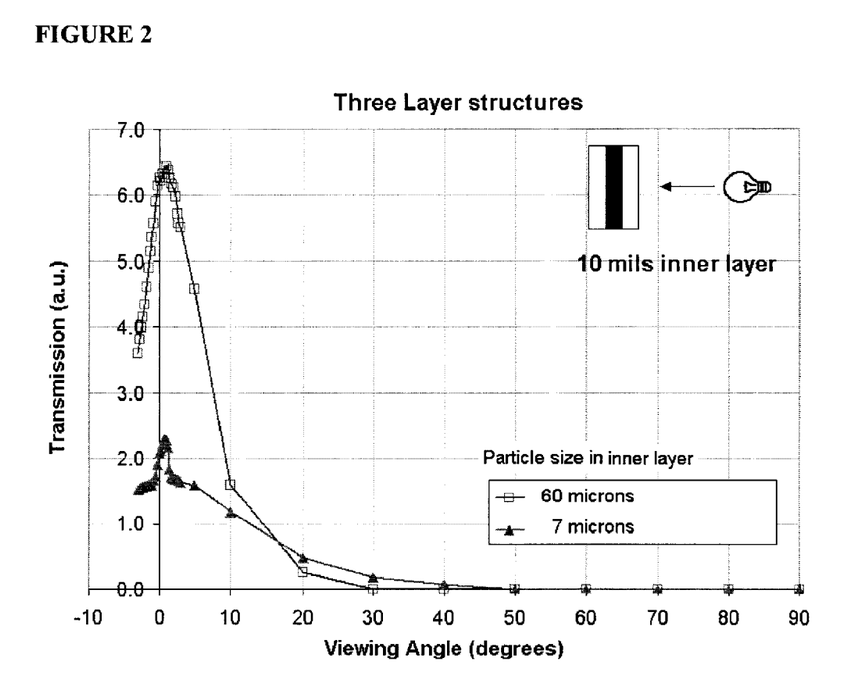
FIG. 2: Is a diagram showing the effect of mean particle size on diffusion properties

The influence of the diffusing particle size was analyzed by comparing multi-layered structures prepared by co-extrusion using particles of different size. The results are presented in the FIG. 2, where the performance of a three-layer laminate containing an interlayer comprised of acrylic particles (weight average particle size=7 microns, index of refraction is 1.46) is compared to that observed in a commercially available acrylic-styrene copolymer particle (particle size=60 microns, refractive index of 1.516). In both cases the composition of the interlayer is similar (40% particles in a polymethylmethacrylate/ethyl acrylate copolymer with a refractive index of 1.492) as well as its thickness (10-15 mils) allowing for a clear understanding of the influence of the particle size on the diffusing behavior.

Calculation of the diffusing properties obtained by goniophotometry indicates a clear contribution of the particle size. This is shown in the following table 1.

TABLE 1

| Sample Ave particle size | Hiding power | Diffusion factor | Half-gain angle (degrees) |
|---|---|---|---|
| 60 microns | 0.975 | 0.028 | 7.28 |
| 7 microns | 0.815 | 0.155 | 10.53 |

Example 2

Figure 3:
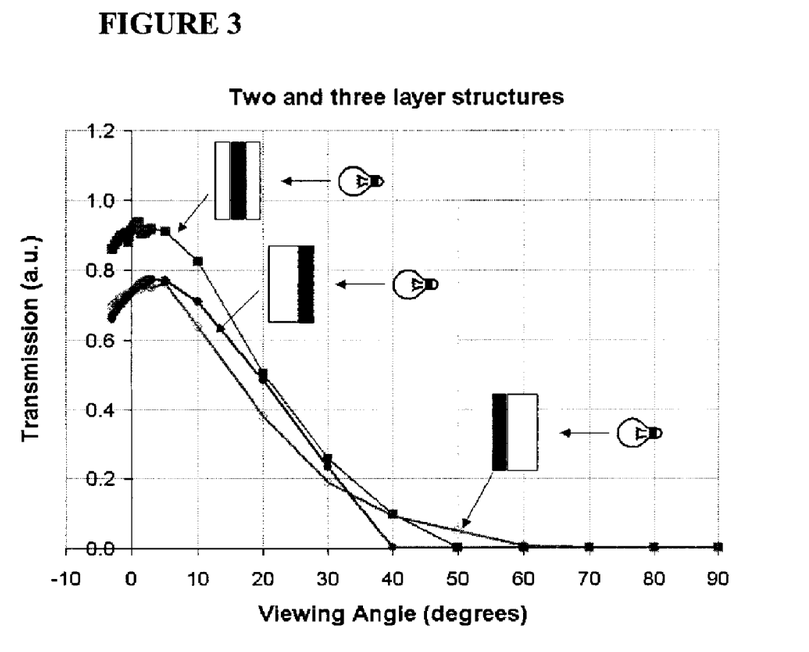
FIG. 3: Is a diagram comparing the light diffusion of 2-layer structures (comparative) with a 3-layer structure of the invention.

Two and three layer structures, each having a diffusing layer of the same thickness (15 mils) and a total substrate thickness of (236 mils) were prepared by applying glycerol between the layers to remove the air pockets. The glycerol used in this study is commercially available (Catalog #13, 487-2, Chemical Abstracts Service Registry Number 56-81-5) from Aldrich Chemical Company, Inc. The manufacturer reported a measured refractive index value of 1.473 on a sample taken from the same lot that we used in our testing. In the case of the 3-layer structure, the substrate layer was two equal (118 mil) layers of a polymethyl methacrylate/ethyl acrylate copolymer (96/4) with a refractive index of 1.492. The melt flow rate of the above copolymer is about 2 g/10 minutes when measured in conformance with ASTM D 1238, Condition 230° C./3.8 kg, Procedure A. The diffusing behavior is shown in FIG. 3. It is shown that a three-layered material provides for better light transmission while retaining good diffusing properties by limiting the contribution of surface roughness of the diffusing layer. This behavior was reproduced at various diffusing layer thickness (5-20 mils), observing the same response.

Example 3

0.118" and 0.236" thick samples of gray three-layered structures (substrate/diffusing layer/substrate) were produced using two different gray colors in the substrate layers. The compounding of the diffusing layer resin involved the preparation of a blend containing 40% by weight of core-shell acrylic based modifiers (EXL-5136 that is commercially available from Rohm and Haas Company) with a weight average particle size of about 7 microns and a refractive index of about 1.46, in a methyl methacrylate/ethyl acrylate copolymer having a melt flow rate of about 8 g/10 minutes when measured in conformance with ASTM D 1238, Condition 230° C./3.8 kg, Procedure A. A typical resin example is Plexiglas® V920 that is commercially available from Arkema Inc. The blend was produced in a WP twin-screw blender, using an additional powder feeder to introduce the diffusing particles. This blend was used to introduce a 15 mils interlayer on the final co-extruded structure. The preparation of the gray substrates included dry-blends of the corresponding gray color concentrate in an MMA/EA copolymer having a melt flow rate of about 2 g/10 minutes when measured in conformance with ASTM D 1238, Condition 230° C./3.8 kg, Procedure A. A typical resin example is Plexiglas® V045 that is commercially available from Arkema Inc. The dry-blends were produced by diluting a color concentrate at a specific let down ratio in the acrylic copolymer matrix, optimizing this ratio to the final thickness of the material. Co-extrusion processing of these materials is done at similar conditions to those typically used for the production of general acrylic sheet. Conditions included for example a speed of 200 rpm in a secondary extruder to produce the required 15 mils interlayer in the final co-extruded structure. The diffusing properties are shown in TABLE 2, as measured by goniophotometry.

TABLE 2

Diffusing properties of multi-layer projection screen materials produced by co-extrusion.

| Sample | Type | Thickness | Hiding Power | Diffusion Factor | Half-Gain Angle (deg) |
|---|---|---|---|---|---|
| Vision 28001 P97 | Monolithic | 0.118" | 0.977 | 0.259 | 17.919 |
| Vision 28001 DP97 | Monolithic | 0.118" | 1.012 | 0.290 | 19.753 |
| PS2514 | Multi-Layer (co-extruded) | 0.118" | 0.9826 | 0.245 | 18.529 |
| PS2514 | Multi-Layer (co-extruded) | 0.236" | 1.0003 | 0.397 | 29.072 |
| PS2094 | Multi-Layer (co-extruded) | 0.118" | 0.9756 | 0.230 | 17.776 |
| PS2094 | Multi-Layer (co-extruded) | 0.236" | 1.0062 | 0.399 | 29.556 |

As mentioned before, these properties are similar to those observed in currently available commercial systems, and in some cases, exceed the typical performance. This can be observed for the case of 0.236" co-extruded structures that display improved diffusion factor (around 0.4) and half-gain angles, (around 30 degrees) maintaining a very high hiding power. The data shows the increased performance of the co-extruded screens of the invention as compared to comparative monolithic commercially available systems.

Example 4

Projection Performance

The projection performance of the material in Example 3 were analyzed by a variety of techniques. Image definition and contrast ratio was evaluated for both developed and commercial samples. Methods were designed in our labs to evaluate contrast ratio following ANSI and ISO recommendations (ON-OFF and checkerboard tests).

In the checkerboard method, the material is tested by projecting a black and white pattern on the surface of the screen and by measuring the specific illuminance on the dark and illuminated regions at different locations of the screen. This test provides information about the contrast ratio, image definition and screen uniformity. Contrast ratio is obtained for example, as the ratio of the statistical averages of the illuminance obtained on the dark and light regions.

A general description of contrast ratio is:

$$\text{contrast\_ratio} = \frac{\left(\frac{\sum_0^{nW} W}{nW}\right)}{\left(\frac{\sum_0^{nB} B}{nB}\right)}$$

where W and B are the illuminance values observed in the white and dark regions during the checkerboard test. The number of white and dark regions in a screen are represented by nW and nB, respectively.

Similarly screen uniformity values could be obtained by the checkerboard test using the following general expressions:

For the white regions $$\text{screen\_uniformity\_average\_white} = \frac{\left(\frac{\sum_0^{nO} W}{nO}\right)_{outside}}{\left(\frac{\sum_0^{nC} W}{nC}\right)_{center}}$$

the numerator in this expression defines the average illuminance obtained in the outside regions of the screen, typically measured far from the center. Similarly, the denominator defines the average illuminance at the center of the screen. In this expression, W is the illuminance at different regions of the screen and nO and nC define the number of measurements taken at the outside regions and at the center of the screen, respectively. Similarly for the dark regions one can use $$\text{screen\_uniformity\_average\_dark} = \frac{\left(\frac{\sum_0^{nO} B}{nO}\right)_{outside}}{\left(\frac{\sum_0^{nC} B}{nC}\right)_{center}}$$

Similar information is obtained by measuring the ratio of the illuminance on the screen surface observed after projecting a completely white image to that obtained after a completely dark image is projected. This defines the FULL ON-FULL OFF test that provides information about the contrast ratio, image definition and screen uniformity.

Further, $$\text{contrast\_ratio} = \frac{W}{B}$$

where W and B are the illuminance values observed on the screen after projecting a completely white and a completely dark image, respectively, as described by the ON/OFF test.

Table 3 describes the projection performance measured in these systems following these methodologies.

TABLE 3

Projection performance of screen materials.

| | Contrast Ratio | | Screen Uniformity Averages | |
|---|---|---|---|---|
| Sample | (W/B) ON/OFF | (W/B) Checkerboard | Checkerboard (Black) | Checkerboard (White) |
| PS2514 | 515.9 | 89.8 | 0.8669 | 0.8074 |
| PS2514 | 516.4 | 71.5 | 0.8665 | 0.9124 |
| PS2094 | 513.7 | 86.9 | 0.8754 | 0.9199 |
| PS2094 | 510.9 | 59.6 | 0.9264 | 0.9217 |

As described in this table, the co-extruded structures of the invention display superior projection performance, showing high values of contrast ratio as measured by the techniques described before. Also, image definition and brightness are excellent. Screen uniformity as obtained by the checkerboard test indicates similar values to those observed in currently available commercial systems and suggest adequate performance on these applications.

Example 5

Figure 4:
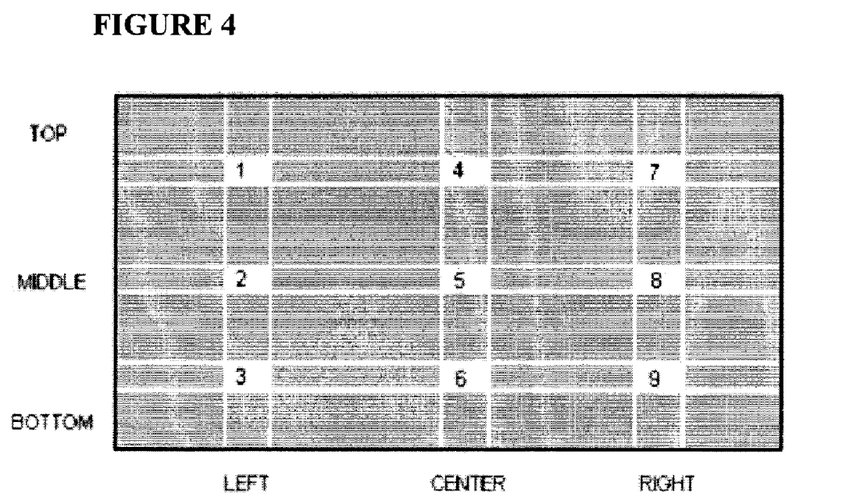
FIG. 4: Illustrates the test method for measuring screen uniformity and projection performance.

A key factor in determining the performance of a screen material produced by co-extrusion is related to the uniformity of the properties observed in a given sample. For the materials of Example 3 screen uniformity was quantified by a variety of techniques showing always very positive results. Detailed analysis on the screen uniformity was performed through analysis of the behavior at different locations of the sheet. In this regard, 9 different regions of the sheet surface were analyzed following the diagram in FIG. 4.

Screen uniformity results indicate a consistent performance throughout the sheet surface. Data regarding the distribution of light diffusing properties along to the sheet is included in Table 4. This table provides an example of the specific performance of two co-extruded screens of the invention

TABLE 4

Diffusing properties of multi-layered projection screens prepared by co-extrusion. Analysis of screen uniformity of PS2094.

| | Hiding Power | Diffusion Factor | Half-Gain Angle |
|---|---|---|---|
| (a) | | | |
| Sample: PS 2094 0.118" | | | |
| Left Strip of Sheet | | | |
| 1 Top Part | 0.979 | 0.249 | 19.063 |
| 2 Middle Part | 0.980 | 0.229 | 17.883 |
| 3 Bottom Part | 0.967 | 0.228 | 17.482 |
| Center Strip of Sheet | | | |
| 4 Top Part | 0.971 | 0.263 | 19.251 |
| 5 Middle Part | 0.967 | 0.209 | 16.612 |
| 6 Bottom Part | 0.983 | 0.218 | 17.518 |
| Right Strip of Sheet | | | |
| 7 Top Part | 0.994 | 0.239 | 18.094 |
| 8 Middle Part | 0.959 | 0.212 | 16.407 |
| 9 Bottom Part | 0.978 | 0.226 | 17.385 |

TABLE 4-continued

Diffusing properties of multi-layered projection screens prepared by co-extrusion. Analysis of screen uniformity of PS2094.

| | Hiding Power | Diffusion Factor | Half-Gain Angle |
|---|---|---|---|
| | | (b) | |
| Sample: PS 2094 0.236" | | | |
| Left Strip of Sheet | | | |
| 1 Top Part | 0.996 | 0.412 | 30.135 |
| 2 Middle Part | 1.002 | 0.369 | 29.163 |
| 3 Bottom Part | 1.006 | 0.412 | 30.291 |
| Center Strip of Sheet | | | |
| 4 Top Part | 1.010 | 0.427 | 31.671 |
| 5 Middle Part | 0.996 | 0.398 | 29.304 |
| 6 Bottom Part | 1.018 | 0.382 | 28.113 |
| Right Strip of Sheet | | | |
| 7 Top Part | 1.010 | 0.393 | 28.502 |
| 8 Middle Part | 1.013 | 0.389 | 28.454 |
| 9 Bottom Part | 1.007 | 0.409 | 29.962 |

As shown in this table, properties are consistent throughout the screen surface and in general suggest a very homogeneous performance of the screen. These results suggest a that well-defined multi-layer structures can be produced by co-extrusion.

Example 6

In a similar manner to Example 5, the performance of the sheets of Example 3 and their uniformity was analyzed in terms of light transmission. An example of these results is described below in Table 5. As in the case of diffusing properties, transmission properties are consistent throughout the screen surface and suggest a very homogeneous and well-defined multi-layer structure produced by co-extrusion with superior performance in screen applications.

TABLE 5

Light transmission of a multi-layered projection screen prepared by co-extrusion. Analysis of screen uniformity of PS2514 (0.236 in).

| Sample: | % Transmission (Y) | | Light Intensity Peak |
|---|---|---|---|
| PS 2514 0.236" | Reflectance | Transmittance | (arbitrary units) |
| Left Strip of Sheet | | | |
| 1 Top Part | 7.477 | 64.487 | 313.2 |
| 2 Middle Part | 7.432 | 66.895 | 413.3 |
| 3 Bottom Part | 7.619 | 64.561 | 252.8 |
| Middle Strip of Sheet | | | |
| 4 Top Part | 7.499 | 64.084 | 265.4 |
| 5 Middle Part | 7.444 | 65.442 | 318.0 |
| 6 Bottom Part | 7.597 | 63.827 | 257.0 |
| Right Strip of Sheet | | | |
| 7 Top Part | 7.379 | 63.92 | 284.1 |
| 8 Middle Part | 7.314 | 65.724 | 383.3 |
| 9 Bottom Part | 7.544 | 62.8 | 250.6 |

What is claimed is:

1. A multi-layer screen comprising:
   a) a diffusing layer comprising:
      1) 40-90 weight percent of a matrix polymer, and
      2) 10 to 60 weight percent of diffusing particles having an average particle size of from 1 to 100 microns, wherein 90% by weight of said particles having an average particle size that is within ±55% of the weight average particle size, and comprising acrylic-based core-shell particles having an alkyl acrylate polymer core and an acrylic shell,
      wherein said diffusing particles and said diffusing layer matrix differ in refractive index by 0.02 or more, and
   b) at least two substrate layers, one on each side of the diffusing layer.

2. The multi-layer screen of claim 1, wherein said multi-layer screen has a thickness of from 0.1 to 10 millimeters.

3. The multi-layer screen of claim 1, wherein said diffusing layer has a thickness of from 0.0254-1.27 millimeters.

4. The multi-layer screen of claim 3, wherein said diffusing layer has a thickness of from 0.254-0.508 millimeters.

5. The multi-layer screen of claim 1, wherein said diffusing layer matrix is an acrylic polymer or copolymer.

6. The multi-layer screen of claim 1, wherein said diffusing particles have an average particle size of 1-40 microns.

7. The multi-layer screen of claim 6, wherein said diffusing particles have an average particle size of 1-25 microns.

8. The multi-layer screen of claim 7, wherein said diffusing particles have an average particle size of 5-9 microns.

9. The multi-layer screen of claim 1, wherein 90% by weight of said diffusing particles have an average particles size that is within ±40% of the average particle size.

10. The multi-layer screen of claim 9, wherein 90% by weight of said diffusing particles have an average particles size that is within ±20% of the average particle size.

11. The multi-layer screen of claim 1, wherein said substrate layers are equal in thickness and composition, providing a symmetrical composite screen.

12. The multi-layer screen of claim 1, wherein said substrate layers are asymmetrical.

13. The multi-layer screen of claim 1, wherein said substrate layers comprise thermoplastic polymers.

14. The multi-layer screen of claim 1, wherein said screen consists of three or more layers.

15. The multi-layer screen of claim 1, wherein at least one substrate layer is an acrylic copolymer.

16. The multi-layer screen of claim 1, wherein at least one substrate layer on the viewer side of the diffusing layer is tinted.

17. The multi-layer screen of claim 1, further comprising an outer layers selected from the group consisting of an abrasion resistant layer, an anti-static layer, and anti-glare layer, and a mixture thereof.

18. The multi-layer screen of claim 1, wherein said screen is formed by co-extrusion or lamination.

19. The multi-layer screen of claim l, wherein the refractive index of the substrate layers are within 0.19 of the refractive index of the diffusing layer matrix polymer.

20. The multi-layer screen of claim 1 comprising a display useful for front projection, rear projection, or a combination of both front and rear projection.

21. The multi-layer screen of claim 1 further comprising impact modifiers in one or more of the substrate layers and/or the diffusing layer.

22. The multi-layer screen of claim 1, further comprising one or more outer layers comprising particles having a mean particle size of about 1 to 60 microns wherein 90% of the particles are less than 70 microns, at a loading of 0.1 to 18%, melt blended with an acrylic matrix, wherein the particle and matrix have refractive indices within 0.02 units when measured in conformance with ASTM D 542.

23. The multi-layer screen of claim 1, further comprising one or more layers that provide one or more properties selected from the group consisting of non-glare, anti-static, scratch or abrasion resistance, anti-reflection, and mar-resistance.

24. A multi-layer screen comprising at least three thermoplastic layers, comprising a diffusing layer comprising core-shell particles having an alkyl acrylate polymer core and an acrylic shell, and at least one substrate layer on either side of said diffusing layer, wherein all substrate layers are transparent and non-tinted, and wherein said screen has a diffusion factor of greater than 0.03 and a half-gain angle greater than 7.3 degrees when measured by goniophotometry on a 236 mils (thick) 3-layer screen.

25. A rear projection multi-layer screen comprising at least three thermoplastic layers, comprising a diffusing layer and at least one substrate layer on either side of said diffusing layer, wherein at least one substrate layer is tinted, and wherein said screen has a diffusion factor of greater than 0.1 and a half-gain angle greater than 10 degrees when measured by goniophotometry on a 236 mils (thick) 3-layer screen.

* * * * *